United States Patent [19]

Sabo

[11] Patent Number: 4,624,040

[45] Date of Patent: Nov. 25, 1986

[54] FRONT WHEEL BEARING PUSHER

[76] Inventor: Alex Sabo, 2147 Hartford Way, Clearwater, Fla. 33575

[21] Appl. No.: 737,683

[22] Filed: May 28, 1985

[51] Int. Cl.[4] ............................................ B23P 19/02

[52] U.S. Cl. ........................................ 29/258; 29/263; 29/266

[58] Field of Search ................. 29/256, 258, 259, 263, 29/266

[56] References Cited

U.S. PATENT DOCUMENTS

| | | | |
|---|---|---|---|
| 3,110,958 | 11/1963 | McCord | 29/263 |
| 3,123,901 | 3/1964 | Traugott | 29/263 |
| 3,142,113 | 7/1964 | Cloud | 29/263 |
| 4,259,774 | 4/1981 | Dolinski et al. | 29/263 |
| 4,285,111 | 8/1981 | Dubach | 29/263 |
| 4,509,241 | 4/1985 | Freeland et al. | 29/263 |

*Primary Examiner*—Frederick R. Schmidt
*Assistant Examiner*—Steven P. Schad
*Attorney, Agent, or Firm*—Ronald E. Smith; Miguel A. Valdes

[57] ABSTRACT

A device for the removal and installation of bearings and hubs on all front wheel drive vehicles. The device comprises a main housing, a threaded rod guider, a bearing pusher, a bearing stopper, a push nut, a hub installer, a hub pusher and a guide lock nut. For the hub removal function, the device uses the hub pusher which exerts a pushing pressure against the hub to be removed. For the wheel bearing removal function, the device uses the bearing pusher which exerts a pushing pressure against the wheel bearing to be removed. For wheel bearing installation function, the device uses the bearing pusher which exerts a pushing pressure against the bearing to be installed. For the hub installation function, the device uses the bearing pusher which exerts a pushing pressure against the hub to be installed. To perform these functions there is no need to remove the wheel bearing housing from the vehicle. Also there is no need for major disassembly of adjacent parts or disturbance of front end alignment.

5 Claims, 11 Drawing Figures

16
14
10
30
32
34
28
26
36
24

FRONT WHEEL BEARING PUSHER

BACKGROUND OF THE INVENTION

1. Field of the Invention

This invention relates to bearing removal and installation devices, and more particularly relates to a device for the removal and installation of bearings and the hubs attached to said bearings on all front wheel drive vehicles.

2. Description of the Prior Art

There are a number of bearing removal and installation devices known to the art. U.S. Pat. No. 3,060,558, issued Oct. 30, 1962 to Levenson discloses a device for removing press fitted axle bearings from rear wheel drive axles. This device includes a pair of diametrically opposed screws to drive a bearing off an axle. U.S. Pat. No. 3,393,441, issued July 23, 1968 to Gebhart describes an apparatus for moving bearings into and out of press-fit relation with shafts. This apparatus includes two thrust plates: one for removing an inner bearing race from a shaft and the other for forcing an inner bearing race into a shaft. U.S. Pat. No. 3,174,218, issued Mar. 23, 1965 to McConaha discloses a bearing removal and installation device in which a tubular member or axle press body for receiving a shaft is provided, at one end, with means for clamping the bearing, and at the other end, with adjustable pressure means for forcing the bearing from the shaft. U.S. Pat. No. 4,339,865, issued July 20, 1982 to Shultz describes an apparatus and method for removing or inserting a bushing or bearing within an automobile transmission. This apparatus includes an elongated bushing or bearing drive shaft, an adjustable size mandrel which includes a plurality of bushing or bearing drive shoulders, a mandrel spreader for adjusting the mandrel drive shoulders to a predetermined dimension, and a depth stop sleeve adjustably mounted on the elongated drive shaft for determining the depth to which the bushing or bearing can be inserted in the transmission.

None of these devices are compact and simple enough to be used for removing and installing bearings and hubs on front wheel drive automobiles. Limited working space is available in front wheel drive vehicles. Therefore, there is a growing need for a compact and simple apparatus for removing and installing bearings and hubs in cars with limited working space, without having to remove the wheel bearing housing and without disturbing front end alignment.

It is, accordingly, a general object of this invention to provide an apparatus that can remove and install bearings and hubs without major disassembly of nearby parts and disturbance of front end alignment.

Another object of this invention is to provide an apparatus that can remove and install bearings and hubs on front wheel drive automobiles.

Still another object of this invention is to provide an apparatus that can remove and install bearings and hubs without requiring the removal of the wheel bearing housing.

SUMMARY OF THE INVENTION

This invention accomplishes these and other objects by providing a device for removing and installing bearings and hubs which comprises a main housing, a threaded rod guider, means for removing and installing the hubs, means for removing and installing the bearings, and means for locking the rod guider into the main housing. The main housing is always installed in front of the wheel bearing housing, where the most working space is available. To remove the hub and wheel bearing the device exerts a pushing force against hub and bearing. The device never exerts a pulling force.

The novel device shortens the job time to half of the time required by the prior art devices. There is no need to remove the wheel bearing housing from the automobile in order to accomplish the removal and installation operation with a hydraulic pressing machine. With the inventive device, the press machine is no longer needed. The device is simple, highly portable and has very few parts. Unlike the hydraulic presses of the prior art, the device is safe. Due to its compactness and versatility, the device may be used in all front wheel drive automobiles (foreign and domestic). To be used in all automobiles, only the size of the bearing pusher and stopper is changed.

The device constitutes a two-in-one tool, because it removes and installs hubs and also bearings. It may be operated by pneumatic or hydraulic means.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

Similar reference numerals refer to similar parts throughout the several views of the drawings.

DETAILED DESCRIPTION OF THE PREFERRED EMBODIMENT

Figures 1, 1D, 1E, 1F:
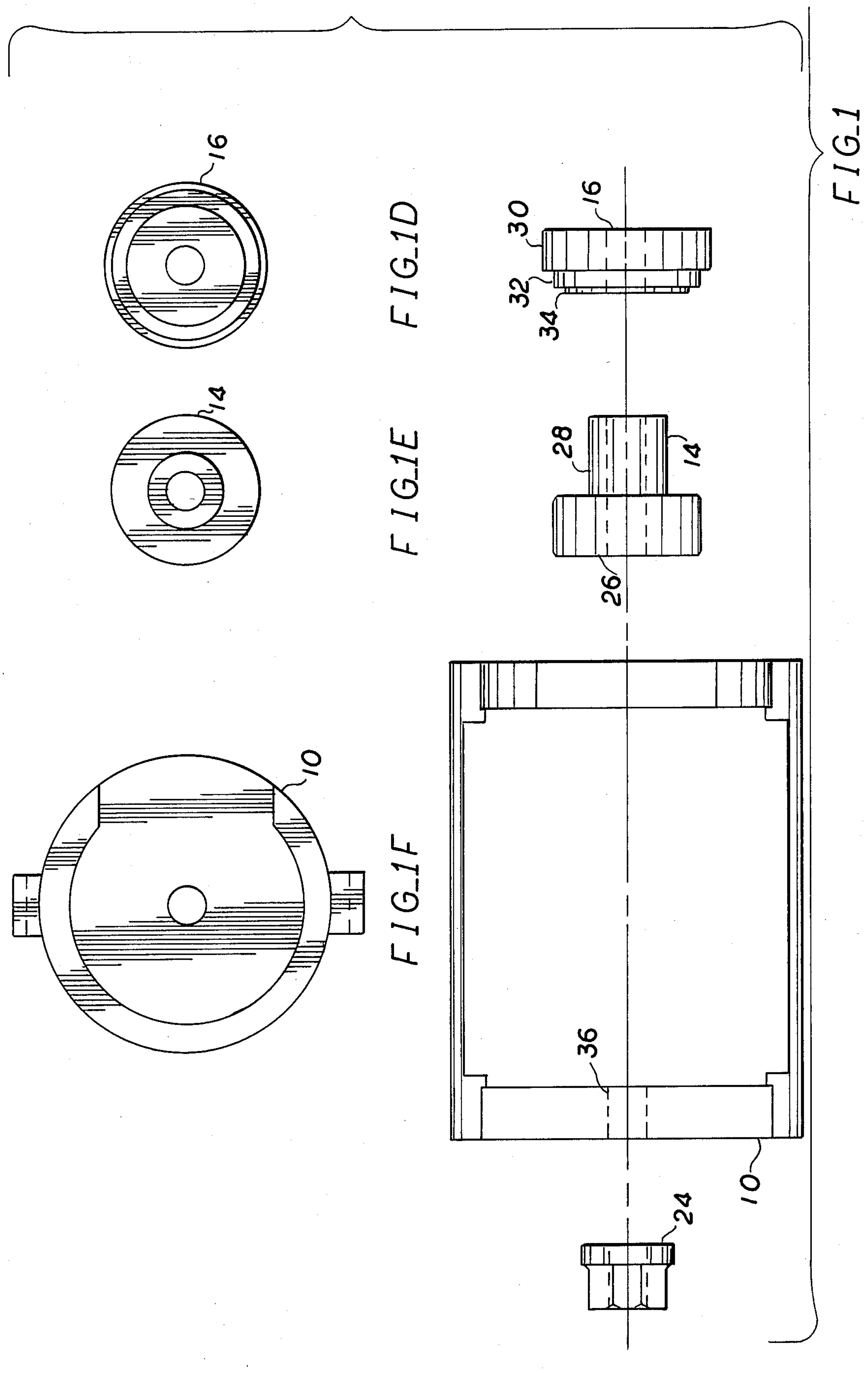
FIG. 1 is an exploded, side elevational view of the novel device.
FIG. 1D is an end view of the bearing stopper member shown in FIG. 1.
FIG. 1E is an end view of the hub installer member shown in FIG. 1.
FIG. 1F is an end view of the housing member shown in FIG. 1.
Figures 1A, 1B, 1C:
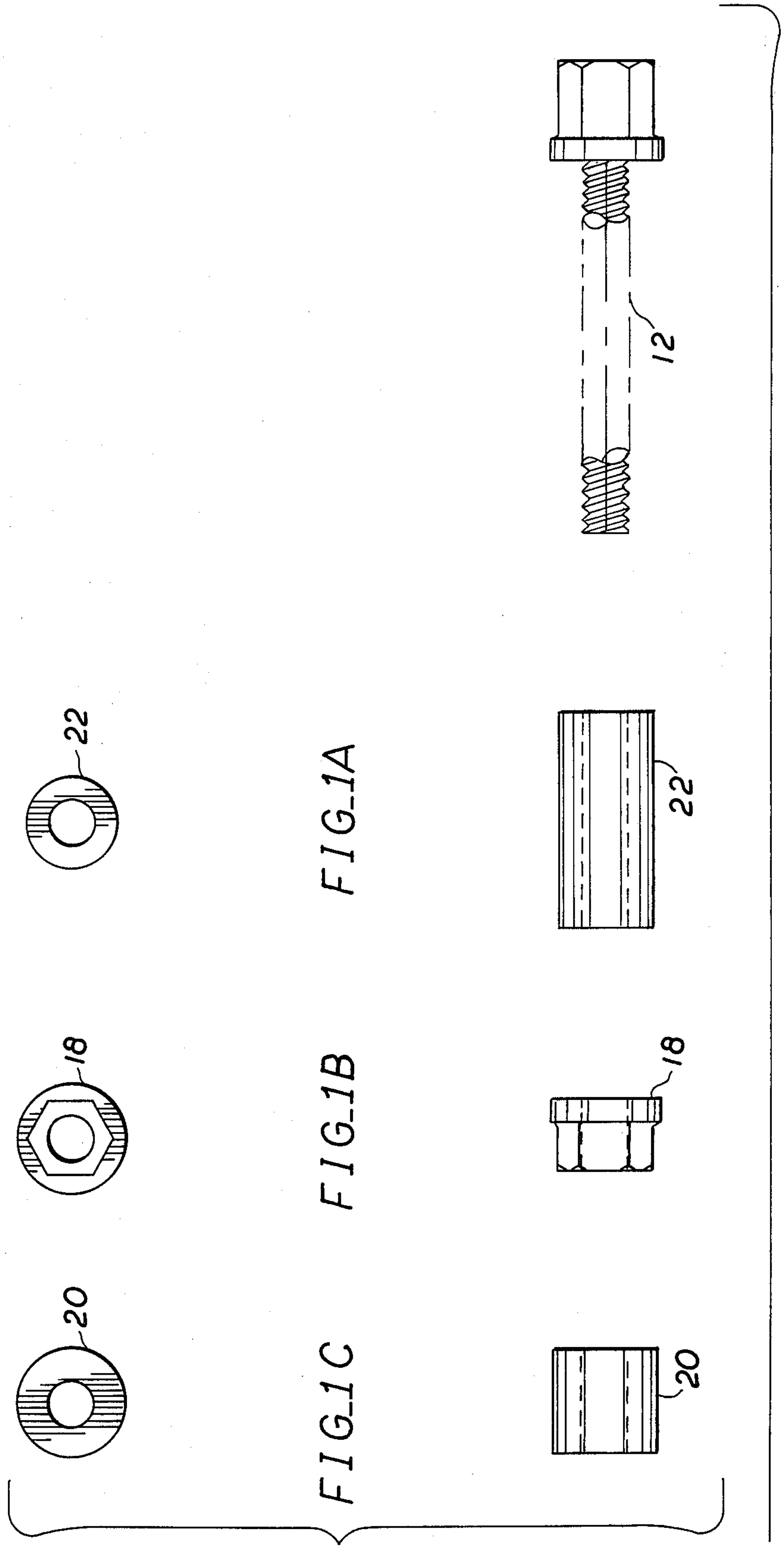
FIG. 1A is an end view of the push nut member shown in FIG. 1.
FIG. 1B is an end view of the hub pusher member shown in FIG. 1.
FIG. 1C is an end view of the bearing pusher member shown in FIG. 1.
Figure 4:
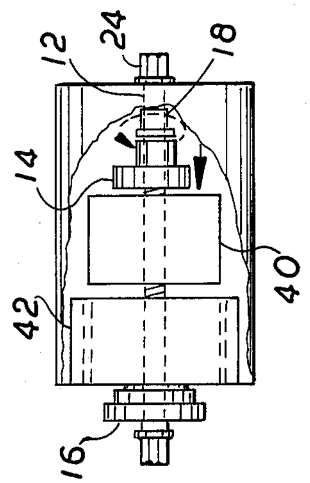
FIG. 4 is a side view, partly in elevation and partly in section, with portions in phantom, showing an embodiment according to the invention assembled on a wheel bearing housing in readiness for installing a bearing thereon.
Figure 5:
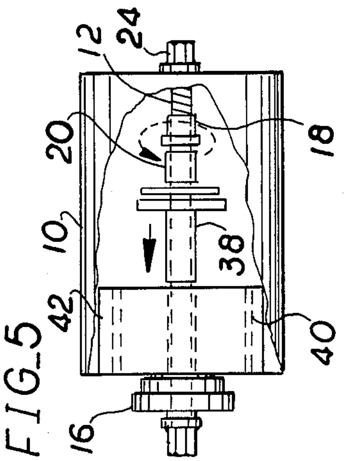
FIG. 5 is a side view, partly in elevation and partly in section, with portions in phantom, showing an embodiment according to the invention assembled on a wheel bearing housing in readiness for installing a hub thereon.

The embodiment according to the invention, as illustrated in FIG. 1, comprises a main housing 10, a threaded rod guider 12, a bearing pusher 14, a bearing stopper 16, a push nut 18, a hub installer 20, a hub pusher 22 and a guide lock nut 24. The main housing or frame 10 is cylindrical in shape and has a closed end that is centrally apertured as at 36 and an open end with a C-shaped rim. More specifically, the side walls of frame 10 are "C"-shaped, i.e., an elongate opening extends the length of frame 10, which opening corresponds to the open portion of the letter "C." This opening allows access into the interior of frame 10, such access being needed in accomplishing the procedures depicted in FIGS. 4 and 5 as will become clear as this description proceeds. FIGS. 4 and 5 depict the non-open side of frame 10, and for this reason the interior of the frame is revealed in such FIGS. by breaking away the closed portion of the side walls of frame 10. The rod guider 12 is a threaded bolt. The bearing pusher 14 has a bearing guider portion 28 and a bearing pusher portion 26. Each portion has a different diameter and the difference in diameters defines the shoulder of the pusher 14. Both portions are coaxially arranged with a round hole coaxially passing therethrough. This hole or aperture receives guider 12. The stopper 16 has a stopper portion 30, a guider portion 32 and a clip-stopping portion 34. All portions are round in shape and have different diameters. All portions are coaxially arranged with a round hole coaxially passing therethrough. The push nut 18 has a hole coaxially passing therethrough as well, and the hub installer 20 has a hole coaxially passing therethrough. Moreover, the hub pusher 22 has a hole coaxially passing therethrough. The guide lock nut 24 has a hole coaxially passing therethrough from one side only. All these holes or apertures have the same diameter and their function is to screw-threadedly receive rod guider 12.

Figure 2:
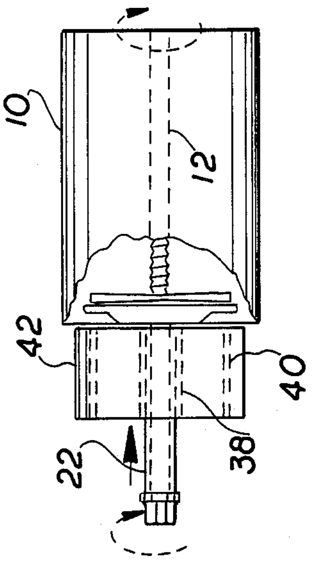
FIG. 2 is a side view, partly in elevation and partly in section, with portions in phantom, showing an embodiment according to the invention assembled on a wheel bearing housing in readiness for removing a hub thereon.

Reference should now be made to FIG. 2. To accomplish hub removal this embodiment uses the housing 10, the rod guider 12, and the hub pusher 22. As shown in FIG. 2, this pusher device will remove a hub 38 from its press-fit relation with a wheel bearing 40, which in turn has a press-fit relation with a wheel bearing housing 42. Prior to using this device, the front tires, the brake rotor, the constant velocity joint and the front axle are removed. Next, the hub pusher 22 is inserted into the rod guider 12, which in turn is inserted into the hub 38 hole and screwed into the rear threaded hole 36 of housing 10. This device now remains attached to the front side of the wheel bearing housing 42, as illustrated in FIG. 2. By tightening the rod guider 12, the hub pusher 22 will exert pushing pressure against the hub 38. This pressure will pull out hub 38 from its seat on wheel bearing 40. Next the rod guider 12 may be loosened from its screw threaded engagement with housing 10. Consequently, the hub 38 and hub pusher 22 may be removed from guider 12. At this point, the inner and outer clips holding bearing 40 to wheel bearing housing 42 can be removed.

Figure 3:
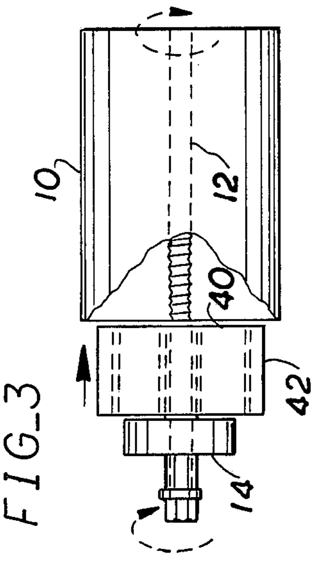
FIG. 3 is a side view, partly in elevation and partly in section, with portions in phantom, showing an embodiment according to the invention assembled on a wheel bearing housing in readiness for removing a bearing thereon.

Referring now to FIG. 3, it will there be seen that to accomplish removal of a wheel bearing this embodiment uses the main housing 10, the rod guider 12, and the bearing pusher 14. This pusher device will remove wheel bearing 40 from its press-fit relation with wheel bearing housing 42. Once the hub 38 and the clips holding bearing 40 to wheel bearing housing 42 are removed, the bearing pusher 14 is inserted into the rod guider 12, which in turn is inserted from the back through the wheel bearing 40 and screwed into the threaded hole 36 of housing 10. This device now remains attached to the front side of the wheel bearing housing 42, as illustrated in FIG. 3. By tightening the rod guider 12, the bearing pusher 14 exerts a pushing pressure against the wheel bearing 40. This pressure will pull out or separate the bearing 40 from its seat on housing 42. Now the rod guider 12 may be loosened from its screw threaded relationship with housing 10. Consequently, the rod guider 12, the main housing 10 and the bearing 40 may be removed. At this point, the removal operation is finished and new wheel bearings and hubs may be installed by using the same embodiment according to the invention.

Refer now to FIG. 4. For the installation of a bearing this embodiment uses the housing 10, the rod guider 12, the bearing stopper 16, the guide lock nut 24, the bearing pusher 14 and the push nut 18. This device will install a new wheel bearing 40 in a press-fit relation with the wheel bearing housing 42. The stopper 16 is inserted onto the rod guider 12, which in turn is inserted from the back through the wheel bearing housing 42. Next the new wheel bearing 40, the bearing pusher 14 and the push nut 18 are inserted in that order onto the rod guider 12. Finally, the rod guider 12 is screwed throughout the threaded hole of housing 10. The rod guider 12 is then tightly locked in place by means of the guide lock nut 24. This device now encloses and remains tightly attached to the wheel bearing housing 42, as illustrated in FIG. 4. By tightening the push nut 18, the bearing pusher 14 will exert a pushing pressure against the wheel bearing 40, in this way inserting 40 in a press-fit relation inside housing 42. The stopper 16 will prevent the rear clip from ejecting out of place and will stop the bearing 40 at the proper position. Now the device may be disassembled by reversing the procedure and the bearing installation operation is finished. Next the outer clip is installed into position at the wheel bearing housing 42.

FIG. 5 depicts the parts used in hub installation. The FIG. 5 embodiment uses the housing 10, the rod guider 12, the bearing stopper 16, the hub installer 20, the push nut 18 and the guide lock nut 24. This device will install hub 38 onto a new wheel bearing 40. The bearing stopper 16 is inserted onto the rod guider 12, which in turn is inserted from the back side of the wheel bearing housing 42 through the already installed wheel bearing 40. Now from the front side of housing 42, the hub 38, the hub installer 20 and the push nut 18 are inserted into the rod guider 12. Finally, guider 12 is screwed throughout the rear threaded hole 36 of housing 10. The guider 12 is then tightly locked in place by means of guide lock nut 24. The device now encloses and remains tightly attached with the wheel bearing housing 42, as illustrated in FIG. 5. By tightening the push nut 18, the hub installer 20 will exert a pushing pressure against the hub 38, thereby inserting hub 38 in a press-fit relation inside the wheel bearing 40. Note that the inner bearing race of bearing 40 is not disturbed since the bearing stopper 16 keeps it in position. At this point, the hub 38 is already installed. Next, the device is disassembled by reversing the procedure and the axle c/v joint, brake caliper, rotor and tires are reinstalled into their respective positions in the automobile.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A device for removing and installing hubs and wheel bearings on front wheel drive vehicles, comprising:

a frame means in the form of a cylindrical hollow housing member;

said housing member having a first, imperforate end wall that is centrally apertured;

said housing member having a second end that is open;

said housing member having a cylindrical in configuration side wall that extends only paritally around said frame means, said side wall defining a "C" shape when seen in end elevation;

said housing member having an access opening that extends between said first end wall and said second open end, said opening being defined by the open portion of said "C"-shaped side wall;

an elongate rod member having a non-circular head engageable by a tool means;

said rod member being threaded along its extent;

said rod member having a distal end opposite from its head end;

said distal end operative to screw threadedly engage the central aperture formed in said first end wall;

a hub removal means including said housing member, said rod member, and a cylindrical hub pusher member that receives said rod member;

a wheel bearing removal means including said housing member, said rod member, and a bearing pusher member that receives said rod member;

a wheel bearing installation means including said housing member, said rod member, said bearing pusher member, a bearing stopper member, a push nut member, and a guide lock nut member;

a hub installation means including said housing member, said rod member, said bearing stopper member, said push nut member, a hub installer member, and said guide lock nut member;

said rod member being rotated about its axis of rotation when said device is employed to remove a hub or a bearing;

said rod member being held against rotation by said guide lock nut member when said device is employed to install a hub or a bearing;

said hub pusher member and said bearing pusher member advancing in a first direction, toward said first end wall, to remove a hub or a bearing responsive to rotation of said rod member;

said bearing pusher member and said hub installer member advancing in a second, opposite direction, toward said second open end, to install a hub or bearing responsive to non-rotation of said rod member and axial travel of said push nut member in said second direction;

and said bearing stopper member preventing axial displacement of a hub or bearing housing responsive to advancement of said push nut member;

whereby four different functions can be performed by only eight parts and whereby the position of said housing member is the same during the performance of all of said functions.

2. The device of claim 1, wherein said bearing pusher member includes a bearing pusher base member and a bearing guide member, both of said members having a cylindrical form and being centrally apertured to receive said rod member therethrough, and said guide member having a smaller diameter than said base member, said difference in diameter defining an annular shoulder.

3. The device of claim 2, wherein said bearing stopper member includes a stopper member, a guide member and a clip-stopping member, all of said members having a cylindrical configuration and being centrally apertured to receive said rod member, said clip-stopping member having a diameter less than the diameter of said guide member and said guide member having a diameter less than the diameter of said stopper member, said differences in diameter defining a pair of concentric annular shoulders.

4. The device of claim 3, wherein said push nut member and said guide lock nut member are centrally apertured and internally threaded nut members that screw threadedly engage said rod member and which have a non-circular drive head portion adapted to be engaged by a tool.

5. The device of claim 4, wherein said hub installer member is a cylindrical in configuration member that slideably receives said rod member.

* * * * *